United States Patent [19]

Natoli

[11] 4,029,953
[45] June 14, 1977

[54] TWIST-LOCK LAMP SOCKET LOCKING MEANS

[75] Inventor: Richard A. Natoli, Girard, Ohio

[73] Assignee: General Motors Corporation, Detroit, Mich.

[22] Filed: Sept. 22, 1975

[21] Appl. No.: 615,236

[52] U.S. Cl. .............................. 240/8.16; 240/52.1; 339/127 R
[51] Int. Cl.² .................... B60Q 3/04; F21V 21/08; H02B 1/02
[58] Field of Search ............... 240/52 R, 52.1, 8.16; 339/17 D, 127 R, 127 C

[56] References Cited
UNITED STATES PATENTS

| | | | |
|---|---|---|---|
| 3,065,335 | 11/1962 | Madansky | 240/52.1 X |
| 3,511,982 | 5/1970 | Salter | 240/8.16 |
| 3,909,096 | 9/1975 | Brzozowski | 339/17 D |

*Primary Examiner*—George H. Miller, Jr.

*Attorney, Agent, or Firm*—J. C. Evans

[57] ABSTRACT

A lamp socket and panel assembly includes a socket panel opening having a plurality of equally spaced radially outwardly directed retention slots therein that receive a plurality of circumferentially spaced socket retention tabs on a lamp socket, each tab is an integrally formed circumferentially extending spring biased cantilevered beam with an end portion insertable through the retention slots and wherein the end portion includes a ramp surface thereon engageable with the socket panel to direct a resultant force onto the end of the spring biased cantilever beam to cause it to flex axially of the panel upon rotation of the socket into an interlocked position on the panel and wherein the flex produced by the cantilevered beams produces an audible indication of movement of the socket from an axially inserted position to a rotatably locked position on the panel.

3 Claims, 6 Drawing Figures

TWIST-LOCK LAMP SOCKET LOCKING MEANS

This invention relates to lamp socket and panel assemblies and more particularly to lamp socket and panel assemblies having coacting means on the panel and on the socket to rotatably lock the socket in place on the socket panel.

Lamp sockets used on automotive vehicles must be securely retained on the panel mounting component. Accordingly, one approach has been to include a plurality of spring biased prongs or retention tabs on the socket which are insertable through a retention hole in the panel having a diameter less than that of the spring prongs or retention tabs. In such cases the spring retention prongs are inserted by pressing them against the edge of the smaller diameter retention opening and forcing them axially through the socket support panel. The prongs first flex radially inwardly and then spring radially outwardly against an inboard surface of the panel for securing the socket thereon. An example of such a lamp socket is set forth in U. S. Pat. No. 3,737,837, issued June 5, 1973, to Whitehead. While such arrangements are suitable for their intended purpose they require the imposition of a substantial axial force on the socket itself before the socket will be forced into a retained position on the panel. When such an arrangement is used on certain lamp housing components, for example injection molded plastic housings having relatively thin cross section, the force required to direct the socket into a retained relationship with the lamp housing may damage the panel on which the socket is supported. Furthermore, under assembly line conditions such socket arrangements may not be properly inserted into a retained relationship with the lamp housing and socket mounting panel thereon and as a result the lamp may be improperly positioned for light reflection from a parabolic mirror component or with respect to reflex lens components of the lamp housing.

In order to avoid the problem of overstress in lamp housing components by insertion of a socket into retained relationship thereon it has been proposed that retention tabs or ears be formed on the socket and that the mounting panel for the socket be configured with a socket hole having a plurality of recesses therein which permit the tabs or ears on the socket to be freely axially inserted through the socket panel to locate the ears on the inboard surface thereof. In such cases, the socket is secured to the panel by rotation of the socket body with respect to the panel to cause the retention ears thereon to move circumferentially of the socket recesses or slots into overlying retained relationship with the panel. An example of such a socket is set forth in U.S. Pat. No. 3,559,152, issued Jan. 26, 1971, to W. Pearce, Jr. Such arrangements, are also suitable for their intended purpose. However, it is possible to freely axially insert such a socket assembly with respect to the socket panel and thereafter rotate it toward a locked position without properly securing the bulb and socket on the panel so as to align filament components of the lamp in a proper orientation with respect to the optical components of a lamp housing.

While it is recognized that the retention of a lamp socket on a panel requires a sequence of direct axial insertion with the imposition of a force on the panel mounting member or a free axial insertion with rotation of a socket into a retained position on the socket panel, prior socket arrangements have not provided a positive assurance of exact, position oriented attachement of a socket on a panel assembly.

Accordingly an object of the present invention is to improve lamp socket and panel mounting asemblies of the type including circumferentially equally spaced retention slots in a socket opening on a panel for permitting the free axial insertion of a socket with respect thereto by the provision of a plurality of circumferentially spaced, integrally formed circumferentially extending cantilever beams integrally formed on the socket of a shape complementary to that of each of said slots for free axial insertion therethrough and wherein each of said beams includes a circumferentially directed arcuate cantilevered segment thereon being axially and radially flexible with respect to the socket and including a ramp surface thereon engageable with the panel after the socket is freely inserted thereon to engage the panel upon rotation of the socket with respect thereto to cause the beam to flex axially and radially and produce an audible indication of movement of the beam from alignment with a slot into a seated, circumferentially offset position to engage the inboard surface of the panel for retaining the socket thereon.

Still another object of the present invention is to improve lamp socket and panel mounting assemblies by the provision of a plurality of integrally formed, circumferentially spaced cantilever beams on one end of a socket arranged with respect to a socket panel opening slots for free axial insertion therethrough and wherein the socket panel and each of the beams have coacting means thereon to cause the beam to flex upon rotation of the socket with respect to the panel to produce a resistance to rotation which must be first overcome before the socket can be rotated and wherein the resistance to rotation is of a magnitude to assure that the beams will rotatably shift circumferentially of the panel opening slots to assume a rotatably indexed position thereon once rotation of the socket is initiated.

Still another object of the present invention is to provide an improved lamp socket and panel mounting assembly of the type set forth in the preceding object wherein the coacting means are in the form of a ramp surface on the free end of each cantilevered beam, engageable with an inboard located edge of the socket mounting panel to produce a resultant force at each end of each of the cantilevered beams to produce flex therein that will produce an audible indication of movement of the socket from its freely axially inserted position within the panel to a rotatably locked position thereon.

Further objects and advantages of the present invention will be apparent from the following description, reference being had to the accompanying drawings wherein a preferred embodiment of the present invention is clearly shown.

IN THE DRAWINGS

Figure 1:
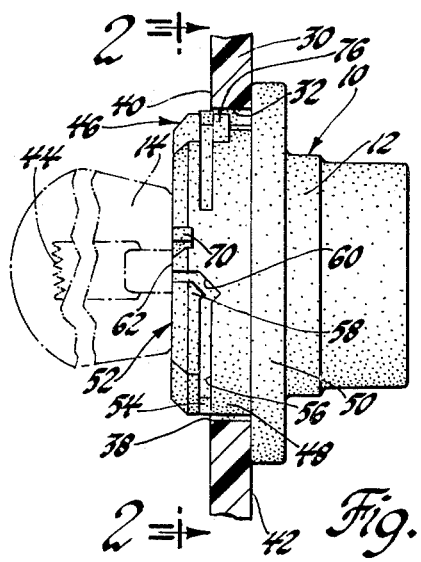
FIG. 1 is a view partly in vertical section and partly in side elevation of a lamp socket and panel mounting assembly of the present invention.

FIG. 1 illustrates a lamp socket asembly 10 including an injection molded body 12 that receives a lamp or bulb unit 14 through one end thereof.

Figure 2:
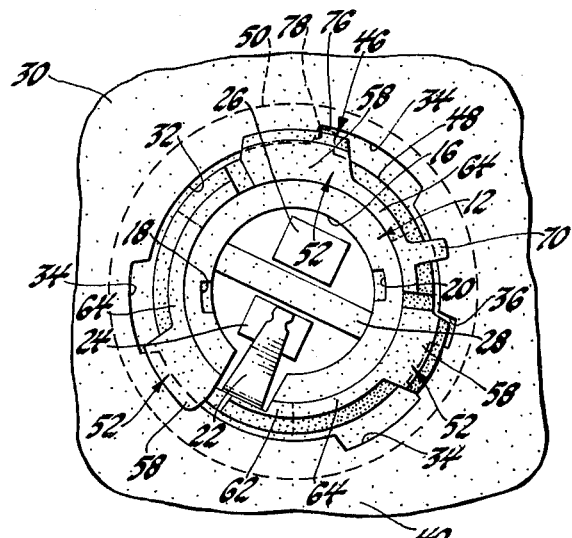
FIG. 2 is an end elevational view taken along the lines 2—2 of FIG. 1 looking in the direction of the arrows.
Figure 6:
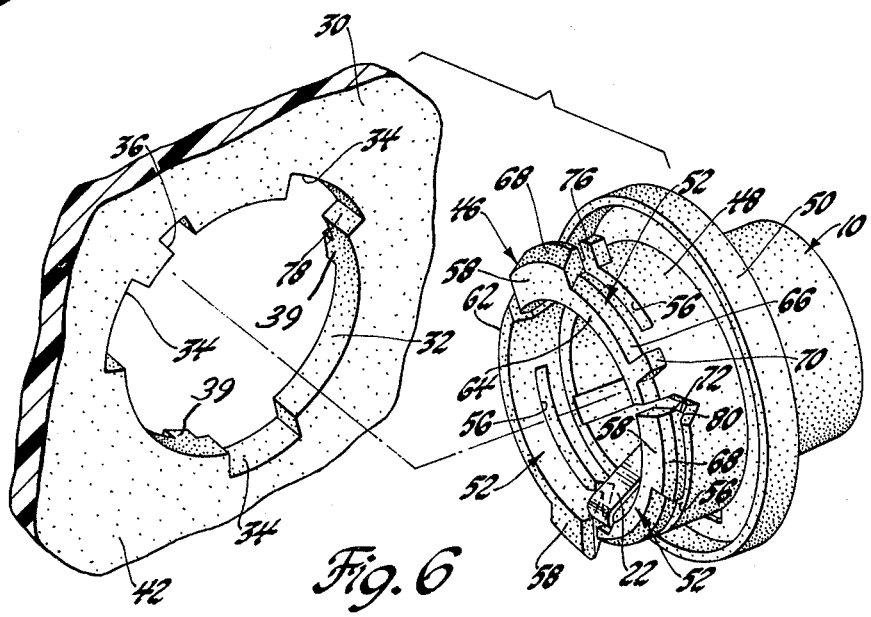
FIG. 6 is an exploded perspective view of the socket panel opening and lamp socket in the assembly of FIG. 1.

As best seen in FIGS. 2 and 6 the socket body 12 includes an axially directed bore 16 formed internally thereof to define an opening for the base of bulb 14. Bore 16 includes a pair of diametrically located longitudinally directed locator slots 18, 20 to receive locating pins on the base of the bulb 14. A spring finger contact 22 is biased outwardly into the bore 16 to electrically connect to the side wall of a standard brass base on the bulb 14. The locator slots 18, 20 will locate base contacts on the bulb 14 in electrical contact with terminals, 24, 26 secured in the bottom of the bore 16 on either side of a separator rib 28 formed integrally of the body 12 and extending across the bore 16 as best seen in FIG. 2.

In the illustrated arrangement a mounting panel 30 receives the assembly 10. It includes a circular opening 32 therethrough having an inside diameter slightly greater than the miximum outside diameter of the bulb 14. The circular opening 32 further includes a plurality of circumferentially, equally spaced, radially outwardly directed retention slots 34 and a locater slot 36 of a reduced arcuate extent as compared to that of the retention slots 34.

Additionally the panel 30 includes an inboard edge 38 formed on each of three equally, circumferentially spaced raised portions 39 on an inboard mounting surface 40.

The inboard mounting surface 40 is located in spaced relationship with the outer surface 42 of the panel 30 as best seen in FIG. 1.

In accordance with certain principles of the present invention the mounting panel 30 is illustrated as being formed of injection molded plastic with reduced cross-section, representative of a typical mounting panel found on lamp housings used in motor vehicle applications and the like. Such sections have limited strength and accordingly it is desirable to locate a socket assembly thereon without imposition of force that might cause an undesirable build-up of stress therein.

Accordingly, it is desirable to include locking means on the socket assembly 10 that will permit it to be freely axially inserted through the panel 30 and thereafter rotated with respect thereto to prevent axially directed force on the panel 30. Moreover, it is desirable to provide locking means on the socket assembly 10 which will assure that the socket asembly 10 is retained in a desired relationship to optical components of the lamp housing by rotatably positioning a filament 44 of the bulb 14 at a fixed rotated position with respect to the panel 30.

In accordance with the present invention an improved socket lock asembly 46 is integrally formed on the inboard end 48 of the body 12 at a point axially spaced woth respect to a continuously formed annular collar 50 on the body 12.

The lock assembly 46 includes a plurality of circumferentially spaced, integrally formed circumferentially extending cantilevered beams 52. Each of the beams 52 includes a root portion 54 integral of the inboard end 48 of the body 12. A slot 56 extends between the inboard end 48 and a free end 58 of the beam 52 through a predetermined arcuate extent of the inboard end 48 as best seen in FIG. 1. The inboard end 48 is also slotted at 60 to receive the free end 58 of the beam 52 axially inwardly of the end face 62 of the inboard end 48.

Each of the beams 52 further includes an arcuate circumferentially directed segment 64 from root portion 54 with an outer surface 66 thereon having an outside diameter corresponding to the inside diameter of the circular opening 32 in the panel 30.

The free end 58 of each of the cantilever beams 52 includes a radially outwardly directed curvilinear lead surfaces 68 thereon congruent to the retention slots 34 to axially locate each of the beams 52 for axial insertion through the opening 32 and retention slots 34. A locator rib 70 fits into slot 36 to circumferentially orient each of the free ends 58 in one of the retention slots 34 for free axial insertion therethrough. The outside diameter of each of the curvilinear lead surfaces 68 is slightly less than the maximum outside diameter of the retention slots 34 to minimize the axial force required to insert the socket assembly 10 into the panel 30.

Figure 3:
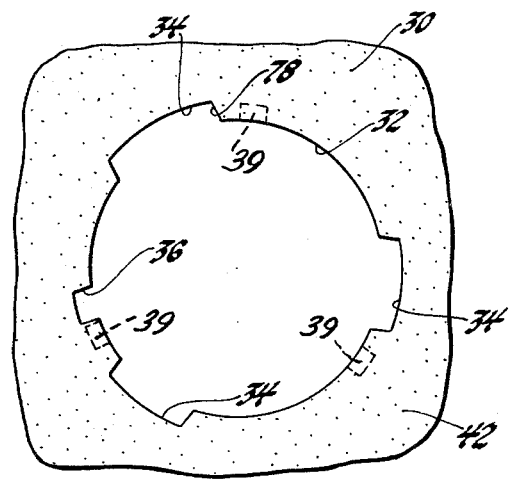
FIG. 3 is a front elevational view of a socket panel opening for receiving the socket of the present invention.
Figure 4:
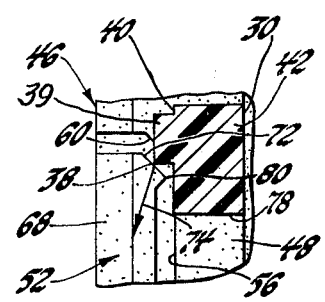
FIG. 4 is an enlarged, fragmentary sectional view of an end portion of a cantilevered beam retention element of the present invention.

Each of the free ends 58 includes a ramp 72 thereon which engages the edge 38 on the inboard surface of panel 30 when the socket body 12 is inserted therein. When the lock assembly 46 is initially inserted through the panel 30, each of the ramps 72 is slightly circumferentially spaced from the adjacent inboard edges 38. To secure the socket assembly 10 on the panel 30, initially the socket body 12 is manually shifted arcuately until the ramps 72 engage the edge 38. The slope of the ramp 72 is configured to produce a resultant force that acts on the ramp 72 to produce both an axially inwardly directed force and a circumferentially directed force on each of the beams 52. The slope of each ramp 72 and the number of beams 52, which in the illustrated embodiment is three in number, are selected to produce an overall resultant force on the socket body 12 to prevent it from being inadvertently shifted only part way on the panel 30. More particularly, the resultant force on each of the ramps 72 required for fastening is of a magnitude to flex the beams 52 to cause the ramps 72 to shift totally inboard of the surface 40 to the position shown in FIG. 5. The vector of the force required to produce such a flex of the beams 52 is shown in FIG. 4 at 74. It is directed generally parallel to the panel 30 so as to avoid excessive stress build-up at the socket opening 32 therein. The fastening force requires a fairly substantial input on the body 12 when it is rotated into a locked position. Since the magnitude of the fastening force is relatively substantial, once it is attained, the socket assembly 10 will continue to rotate by virtue of the inertia of its mass to a position wherein a second locator rib 76 on the end 48 will be rotated into engagement with a stop surface 78 formed on one of the retention slots 34 in FIG. 3. At this point the socket assembly 10 is properly oriented with respect to the panel 30 so that the filaments 44 will have a desired optical relationship with components of the lamp housing.

Figure 5:
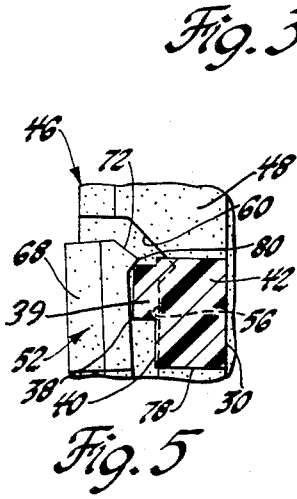
FIG. 5 is an enlarged, fragmentary elevational view showing the end of the cantilevered beam retention element after it has been rotatably secured to the panel.

Once the force build-up on the ramp 72 is sufficient to cause assured rotation of the socket assembly 10 into a position wherein the rib 76 and stop surface 78 are in engagement with one another the free ends 58 on the cantilever beams 52 will be shifted circumferentially of the retention slots 34 as shown in FIG. 2 against the inboard surface 40 to hold the seal collar 50 against the outer surface 42 of the panel 30. As shown in FIG. 5, each of the beams 52 is deflected axially inboard from the position shown in FIG. 4 so as to maintain a biased engagement between the collar 50 and the outer surface 42.

Following free insertion of the socket asembly 10 onto the panel 30 and initial engagement of the ramp 72 with the edge 38, a substantial force is required to produce assured rotation of the socket 12 onto the panel 30. As the ramps 72 move from the position shown in FIG. 4 to the position shown in FIG. 5 the axial flex of the beams 52 will cause a V-shaped edge 80 on the free end 58 to produce an audible signal as the sharp edge passes over the sharp edge of the inboard edge 38 and across the raised portions 39. The audible signal is produced when the fastening force is sufficient to cause assured rotation of socket asembly 10 into its rotatably indexed position.

By virtue of the aforesaid arrangement and by way of summary, a socket may be secured on a relatively thin section panel member without the imposition of a substantial axial force thereon. Furthermore the socket will only be rotatably shifted into an interlocked relationship with a panel 30 if a positive rotative fastening force is directed thereagainst which will assure that it will assume its properly indexed positioned relationship with panel 30. Additionally, by virtue of the cantilevered beam and its free end portion configuration, such proper positioning is indicated by an audible signal. As a result lamp socket asemblies can be secured to panels more reliably under assembly line conditions. The steps of assembling include the desirable result of reduced stress of the socket panel at the mounting hole upon axial insertion of the socket with respect thereto.

While the embodiment of the present invention, as herein disclosed, constitutes a preferred form, it is to be understood that other forms might be adopted.

What is claimed is:

1. A lamp socket assembly comprising a socket support panel having a socket opening therein with a plurality of circumferentially spaced, radially outwardly directed retention slots, a socket having a plurality of circumferentially spaced integrally formed cantilevered beams formed on one end thereof, each of said beams having a root potion secured to said socket and a circumferentially directed arcuate segment extending from said root portion and being longitudinally flexible with respect to said socket, each of said beams including a radially outwardly directed surface congruent to said retention slots for guided axial alignment therewith, said beams being freely axially movable in guided relationship with respect to said slots for locating said socket on said panel, each of said beams having a free end portion thereon with a ramp formed thereon, first coacting means on said panel and said ramps for causing said free end portions to flex across and engage said panel to audibly indicate rotation of said socket from its axially inserted position within said panel to a retained position wherein said free end portions are arcuately shifted out of axial alignment with said slots, second coacting means on said socket and said panel to establish a rotatably indexed position of said socket with respect to said panel, said beams applying an axial retention bias between said socket and said panel when in the indexed position thereby to tightly hold said socket against vibrations with respect to said panel.

2. A lamp socket assembly comprising a socket support panel having a socket opening therein with at least three circumferentially, equally spaced radially outwardly directed retention slots, a socket having a plurality of circumferentially spaced integrally formed beams formed on one end thereof complementary to said slots, each of said beams having a root portion secure to said socket and a circumferentially directed arcuate cantilever segment extending from said root portion and being axially and radially flexible with respect to said socket, each of said beams including a radially outwardly directed surface congruent to a respective one of said retention slots for guided axial alignment therewith, said beams being freely axially movable in guided relationship with respect to said slots for locating said socket on said panel, each of said beams having a free end portion thereon with a ramp formed thereon, first coacting means on said panel and said ramps for causing said free end portions to flex across and to engage said panel to audibly indicate rotation of said socket from its axially inserted position within said panel to a retained position thereon wherein said free end portions are arcuately shifted out of axial alignment with said slots, second coacting means on said socket and said panel to establish a rotatably indexed position of said socket with respect ot said panel, said beams applying an axial retention bias between said socket and said panel when in the indexed position thereby to tightly hold said socket against vibrations with respect to said panel.

3. A lamp socket assembly comprising a socket suppot panel having a socket opening therein with a plurality of circumferentially spaced, radially outwardly directed retention slots, said panel including a plurality of sharp inboard edges formed around said opening, a socket having a plurality of circumferentially spaced integrally formed cantilevered beams formed on one end thereof, each of said beams having a root portion secured to said socket and a circumferentially directed arcuate segment extending from said root portion and being longitudinally flexible with respect to said socket, each of said beams including a radially outwardly directed surface congruent of said retention slots for guided axial alignment therewith, said beams being freely axially movable in guided relationship with repect to said slots for locating said socket on said panel of said beams having a free end portion thereon with a ramp formed thereon, said ramps being engageable with said inboard edges of said panel at a predetermined angular relationship to produce a resultant rotative fastening force on said panel generally parallel to the plane thereof, said beams having a flexure to resist socket rotation until the fastening force is of a magnitude to assure complete socket rotation, said ramps having a sharp edge engageable with said panel upon rotation of said socket on said panel to audibly indicate rotation of said socket from its axially inserted position within said panel to a retained position wherein said free end portions are arcuately shifted out of axial alignment with said slots, coacting means on said socket and said panel to establish a rotatably indexed position of said socket with respect to said panel, said beams applying an axial retention bias between said socket and said panel when in the indexed position thereby to tightly hold said socket against vibrations with respect to said panel.

* * * * *